(12) United States Patent
Ivanov

(10) Patent No.: US 12,231,261 B2
(45) Date of Patent: *Feb. 18, 2025

(54) EMI REDUCTION IN PLCA-BASED NETWORKS THROUGH BEACON TEMPORAL SPREADING

(71) Applicant: Microchip Technology Incorporated, Chandler, AZ (US)

(72) Inventor: Galin I. Ivanov, Stutensee (DE)

(73) Assignee: Microchip Technology Incorporated, Chandler, AZ (US)

( * ) Notice: Subject to any disclaimer, the term of this patent is extended or adjusted under 35 U.S.C. 154(b) by 84 days.

This patent is subject to a terminal disclaimer.

(21) Appl. No.: 18/200,771

(22) Filed: May 23, 2023

(65) Prior Publication Data

US 2023/0291606 A1 Sep. 14, 2023

Related U.S. Application Data

(63) Continuation of application No. 17/409,858, filed on Aug. 24, 2021, now Pat. No. 11,700,146.

(60) Provisional application No. 63/070,643, filed on Aug. 26, 2020.

(51) Int. Cl.
*H04L 12/413* (2006.01)

(52) U.S. Cl.
CPC .................. *H04L 12/413* (2013.01)

(58) Field of Classification Search
None
See application file for complete search history.

(56) References Cited

U.S. PATENT DOCUMENTS

| 6,055,578 A | 4/2000 | Williams et al. ............. 709/253 |
| 6,643,317 B1 | 11/2003 | Blumer ......................... 375/130 |
| 7,974,264 B2 | 7/2011 | Rothschild ..................... 370/350 |
| 10,798,702 B2 | 10/2020 | Amini et al. |

(Continued)

FOREIGN PATENT DOCUMENTS

| CN | 108738052 A | 11/2018 | ............. H04L 45/02 |
| CN | 111095992 A | 5/2020 | ............ H04W 52/02 |

OTHER PUBLICATIONS

International Search Report and Written Opinion, Application No. PCT/US2021/047645, 13 pages, Nov. 18, 2021.

(Continued)

*Primary Examiner* — Kibrom T Hailu
*Assistant Examiner* — Berhanu D Belete
(74) *Attorney, Agent, or Firm* — SLAYDEN GRUBERT BEARD PLLC

(57) ABSTRACT

An apparatus may be communicatively coupled to other nodes in a network. The apparatus may include a control circuit configured to repeatedly issue transmission cycles to the other nodes. A given transmission cycle may include a least one send slot for each of the other nodes to send data. The control circuit may be configured to initiate transmission cycles by issuing beacon signals to the other nodes. The control circuit may be configured to determine when to issue a beacon signal in a given transmission cycle by determining that all of the other nodes have completed all associated send slots in an immediately previous transmission cycle and based upon a determination of the completion of the other nodes' transmission, delaying transmission of the beacon signal for the given transmission cycle.

18 Claims, 14 Drawing Sheets

(56) References Cited

U.S. PATENT DOCUMENTS

| | | | |
|---|---|---|---|
| 11,026,154 B2 | 6/2021 | Nicholls et al. | |
| 2004/0233905 A1* | 11/2004 | Weber | H04L 12/417 |
| | | | 370/503 |
| 2009/0238133 A1* | 9/2009 | Sakoda | H04W 72/569 |
| | | | 370/329 |
| 2011/0235610 A1* | 9/2011 | Oksman | H04L 12/4035 |
| | | | 370/329 |
| 2012/0057620 A1* | 3/2012 | Yamamoto | H04W 48/10 |
| | | | 375/259 |
| 2012/0147802 A1* | 6/2012 | Ukita | H04W 52/0258 |
| | | | 370/311 |
| 2012/0320881 A1 | 12/2012 | Hong et al. | 370/336 |
| 2013/0235773 A1* | 9/2013 | Wang | H04W 52/0203 |
| | | | 370/311 |
| 2014/0056286 A1* | 2/2014 | Nagata | H04Q 9/00 |
| | | | 370/336 |
| 2015/0016391 A1* | 1/2015 | Sakoda | H04W 74/0808 |
| | | | 370/329 |
| 2015/0071281 A1* | 3/2015 | Shiotani | H04L 47/283 |
| | | | 370/350 |
| 2015/0358351 A1* | 12/2015 | Otsuka | H04L 12/66 |
| | | | 726/23 |
| 2016/0191364 A1* | 6/2016 | Ajitomi | H04L 43/10 |
| | | | 709/224 |
| 2017/0111890 A1* | 4/2017 | Matsuo | H04W 72/23 |
| 2019/0363991 A1* | 11/2019 | Sostawa | H04L 12/40156 |
| 2020/0136857 A1 | 4/2020 | Yun et al. | |
| 2020/0136993 A1* | 4/2020 | Yun | H04L 69/323 |
| 2020/0287995 A1* | 9/2020 | Park | H04L 69/22 |
| 2020/0295957 A1 | 9/2020 | Kim et al. | |
| 2022/0070021 A1* | 3/2022 | Ivanov | H04L 12/413 |

OTHER PUBLICATIONS

Chinese Office Action, Application No. 202180030194.8, 19 pages, Aug. 23, 2023.

* cited by examiner

EMI REDUCTION IN PLCA-BASED NETWORKS THROUGH BEACON TEMPORAL SPREADING

CROSS-REFERENCE TO RELATED APPLICATIONS

This application is a continuation of U.S. application Ser. No. 17/409,858 filed on Aug. 24, 2021, which claims priority to U.S. Provisional Application No. 63/070,643, filed on Aug. 26, 2020, which are incorporated herein in their entirety.

PRIORITY

This application claims priority to U.S. Provisional Patent Application No. 63/070,643 filed Aug. 26, 2020, the contents of which are hereby incorporated in their entirety.

FIELD OF THE INVENTION

The present disclosure relates to Ethernet communications and, more particularly, to reducing electromagnetic interference (EMI) in PHY layer collision avoidance (PLCA) enabled networks (following the IEEE 802.3cg standard, also known as Single Twisted Pair Ethernet, 10SPE, or 10BASE-T1S) using temporal spreading of beacons therein.

BACKGROUND

10SPE is a proposed standard currently under revision and development. 10SPE defines Ethernet local area, access and metropolitan area networks. Ethernet is specified at selected speeds of operation; and uses a common media access control (MAC) specification and management information base (MIB). The Carrier Sense Multiple Access with Collision Detection (CSMA/CD) MAC protocol specifies shared medium (half duplex) operation, as well as full duplex operation. Speed specific Media Independent Interfaces (MIIs) provide an architectural and optional implementation interface to selected Physical Layer entities (PHY). The Physical Layer encodes frames for transmission and decodes received frames with the modulation specified for the speed of operation, transmission medium and supported link length. Other specified capabilities include control and management protocols and the provision of power over selected twisted pair PHY types.

SUMMARY

Examples of the present disclosure may include an apparatus. The apparatus may include a network interface. The network interface may be configured to communicatively couple the apparatus to one or more other nodes in a network. The apparatus may include a control circuit configured to repeatedly issue transmission cycles to the other nodes through the network interface. A given transmission cycle may include a least one send slot for each of the other nodes to send data. The control circuit may be configured to initiate transmission cycles by issuing beacon signals to the other nodes. The control circuit may be configured to determine when to issue a beacon signal in a given transmission cycle by determining that all of the other nodes have completed all associated send slots in an immediately previous transmission cycle, thus completing the other nodes' transmission. The control circuit may be configured to further determine when to issue a beacon signal in a given transmission cycle by, based upon a determination of the completion of the other nodes' transmission, delaying transmission of the beacon signal for the given transmission cycle.

Examples of the present disclosure may include, at a node in a network, repeatedly issuing transmission cycles to the other nodes in the network interface. A given transmission cycle may include a least one send slot for each of the other nodes to send data. The method may include initiating transmission cycles by issuing beacon signals to the other nodes. The method may include determining when to issue a beacon signal in a given transmission cycle by determining that all of the other nodes have completed all associated send slots in an immediately previous transmission cycle, thus completing the other nodes' transmission. The method may include determining when to issue a beacon signal in a given transmission cycle further by, based upon a determination of the completion of the other nodes' transmission, delaying transmission of the beacon signal for the given transmission cycle.

DETAILED DESCRIPTION

Figure 1:
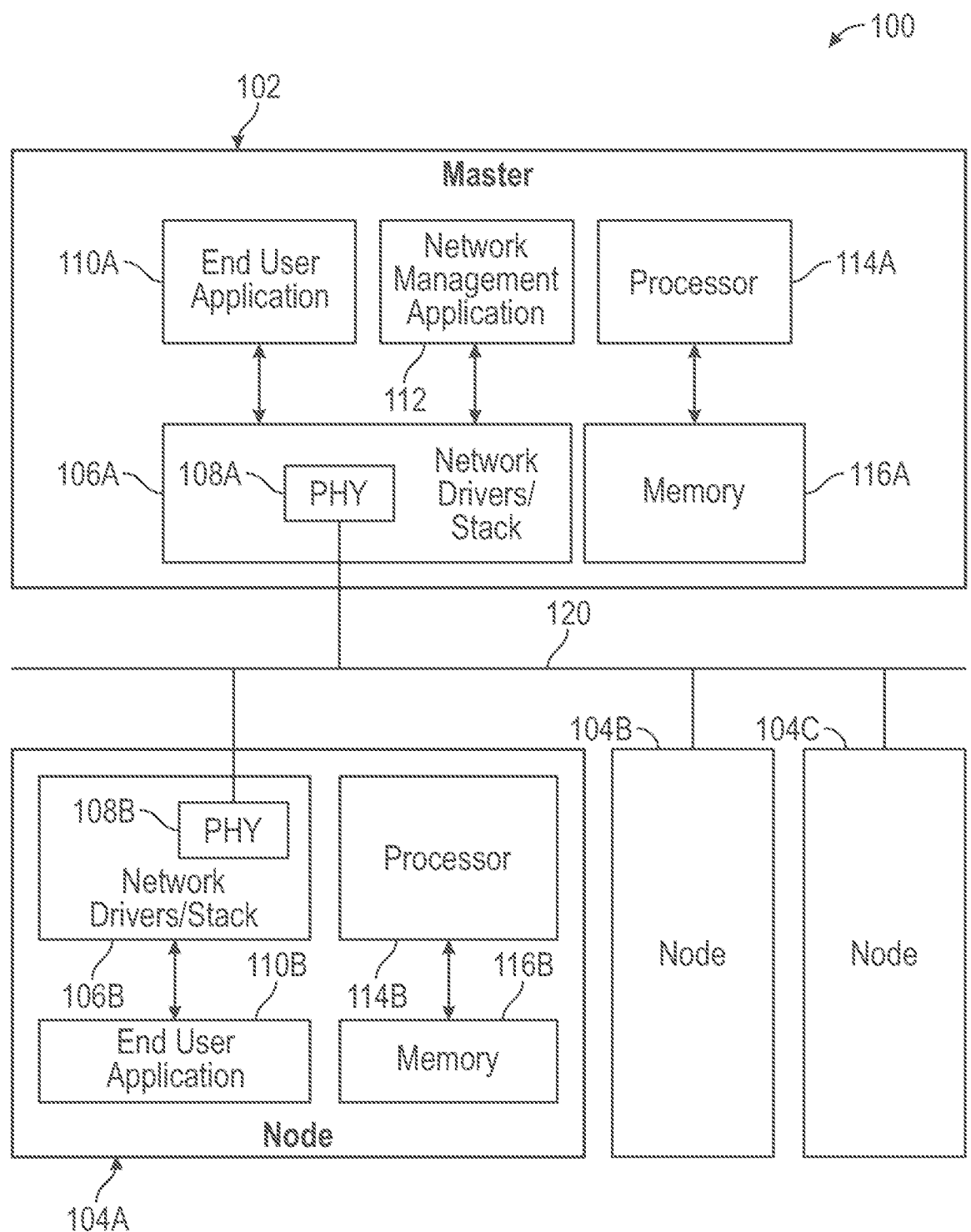
FIG. 1 is an illustration of example 10SPE network, according to examples of the present disclosure.

Examples of the present disclosure may include an apparatus. The apparatus may include a network interface configured to communicatively couple the apparatus to one or more other nodes in a network. The network interface may be of any suitable network protocol, such as 10SPE. The apparatus may include a control circuit. The network interface and control circuit may be implemented by analog circuitry, digital circuitry, instructions for execution by a processor, or any suitable combination thereof. The network may include any suitable number and kind of nodes. The nodes may be physical or virtual electronic devices. At least one node may be a network controller node, such as a PLCA controller node, configured to perform network allocation, assignments, or other management tasks on behalf of other nodes in the network. The tasks of a network controller node may be implemented by a network management application. Each node may be implemented with network drivers or a stack. The stack may be represented by operation of the control circuit. The control circuit may include or be communicatively coupled to a PHY layer. Network traffic may be generated at a given node for communication to the other nodes of the network. The control circuit of a given node may be configured to repeatedly issue transmission cycles to the other nodes through the network interface. A given transmission cycle may include a least one send slot for each of the other nodes to send data. The send slot may be an time opportunity for a given node to send data. A given node may repeat the transmission cycle to the next node, except for inserting its own data at the given time. The control circuit of a given node may be configured to initiate transmission cycles by issuing beacon signals to the other nodes. Determining when to issue a beacon signal in a given transmission cycle may be performed by determining that all of the other nodes have completed all associated send slots in an immediately previous transmission cycle, thus completing the other nodes' transmission. The beacon signal may further be delayed for the given transmission cycle.

In combination with any of the above embodiments, the control circuit may be further configured to selectively delay transmission of the beacon signal for the given transmission cycle based upon possible generation of electromagnetic interference from the apparatus or the other nodes. The EMI may be measured or detected.

In combination with any of the above embodiments, the control circuit may be further configured to selectively delay transmission of the beacon signal for the given transmission cycle based upon two or more further immediately previous transmission cycles having lengths shorter than a threshold. The specific threshold may be evaluated for a given system, and example threshold may be less than two nodes using their respective send slots. Another example threshold may be the quantity of a minimum length transmission cycle plus 10%.

In combination with any of the above embodiments, the control circuit may be further configured to selectively delay transmission of the beacon signal for the given transmission cycle based upon two or more further immediately previous transmission cycles having lengths that are within a threshold difference of each other. Such a threshold may be, for example, whether the two lengths are within 10%, 5%, or 1% of each other.

In combination with any of the above embodiments, the control circuit may be further configured to set a delay of transmission of the beacon signal for the given transmission cycle that is different than a non-zero delay of transmission of a beacon signal for the immediately previous transmission cycle.

In combination with any of the above embodiments, the control circuit may be further configured to set a variable delay of transmission of the beacon signal for the given transmission cycle. The variable delay may vary between each transmission cycle.

In combination with any of the above embodiments, the control circuit may be further configured to set a delay of transmission of the beacon signal for the given transmission cycle that is a random value.

In combination with any of the above embodiments, the control circuit may be further configured to set a delay of transmission of the beacon signal for the given transmission cycle according to a periodic function. The periodic function may include a sawtooth signal, a triangle signal, a sinusoidal signal, a ramp function, or any other suitable function or signal.

In combination with any of the above embodiments, the control circuit may be further configured to set a delay of transmission of the beacon signal for the given transmission cycle according to a function, wherein the delay of transmission of the beacon signal for the given transmission cycle is longer than a delay of transmission of a beacon signal for the immediately previous transmission cycle, wherein the delay of transmission of the beacon signal for the immediately previous transmission cycle was longer than a delay of transmission of a beacon signal for a further immediately previous transmission cycle.

In combination with any of the above embodiments, the control circuit may be further configured to set a delay of transmission of the beacon signal for the given transmission cycle according to a function, wherein the delay of transmission of the beacon signal for the given transmission cycle is shorter than a delay of transmission of a beacon signal for the immediately previous transmission cycle, wherein the delay of transmission of the beacon signal for the immediately previous transmission cycle was shorter than a delay of transmission of a beacon signal for a further immediately previous transmission cycle.

In combination with any of the above embodiments, the control circuit may be further configured to set a delay of transmission of the beacon signal for the given transmission cycle by adding additional send slots to the immediately previous transmission cycle, wherein the additional send slots are configured to be unused by any of the nodes.

In combination with any of the above embodiments, the control circuit may be further configured to set a delay of transmission of the beacon signal for the given transmission cycle by increasing a quantification of a total number of nodes in the network.

FIG. 1 is an illustration of an example 10SPE network 100, according to examples of the present disclosure. As used in the present disclosure, 10SPE may refer to any 10SPE, 10Base-T1S, 10Base-T1L, or similar network. Network 100 may include any suitable number and kind of elements. The elements may include physical or virtual electronic devices. These may be referred to as nodes. For example, network 100 may include nodes 102, 104A, 104B, 104C. These nodes may be configured to communicate with each other over a network medium 120. Network medium 120 may be implemented in any suitable manner, such as by a 10SPE network communication protocol.

Node 102 may be a network controller node, such as a PLCA controller node. Node 102 may act as a network controller node by performing network allocation, assignments, or other management tasks on behalf of other nodes in the network. Such tasks may be performed in node 102 by, for example, a network management application 112. Nodes 102, 104A, 104B, 104C may each be implemented with network drivers or a stack, represented by a control circuit 106. Control circuit 106 may include or be communicatively coupled to a PHY layer 108. Nodes 102, 104A, 104B, 104C may each include one or more end user applications 110, processors 114, and memories 116.

End user applications 110, network management application 112, and network drivers or stacks represented by control circuit 106 may include software, libraries, functions, scripts, applications, code, or other instructions for execution by processors 114. The instructions may be stored on respective memories 116. The instructions, when executed by processors 114, may cause user applications 110, network management application 112, and control circuits 106 to perform the functionality of the present disclosure. Memories 116 may be implemented by one or more memory elements of any suitable implementation, whether long-term or short-term storage. Processors 114 may be implemented by one or more of any suitable processor, core, or microcontroller. Moreover, control circuits 106 may be implemented by any suitable instructions for execution by processors 114 (as discussed above), analog circuitry, digital circuitry, or any suitable combination thereof.

Nodes 102, 104A, 104B, 104C may implement any suitable electronic device, such as a computer, laptop, server, virtual machine, mobile device, or automotive electronic control unit (ECU). Nodes 102, 104A, 104B, 104C may each include different implementations of end user applications 110. End user applications 110 may require communication with others of end user applications 110 or others of nodes 102, 104A, 104B, 104C. Such communication may be performed, for example using 10SPE over network medium 120.

Although a certain number of nodes are shown in FIG. 1, network 100 may include any suitable number and combination of 10SPE-enabled nodes.

Each node may be configured to perform traffic shaping. In one example, such shaping may be performed in hardware using digital logic. In another example, hooks may be implemented in hardware of each node so that firmware can also observe and shape traffic. Shaping traffic may be performed to enforce bandwidth fairness or prioritization for time-sensitive nodes.

Communication between nodes 102, 104A, 104B, 104C may be performed using transmission cycles and frames shown in the following features. Each of nodes 102, 104A, 104B, 104C may be configured to communicate with each other using frames that conform the following examples.

Figure 2:
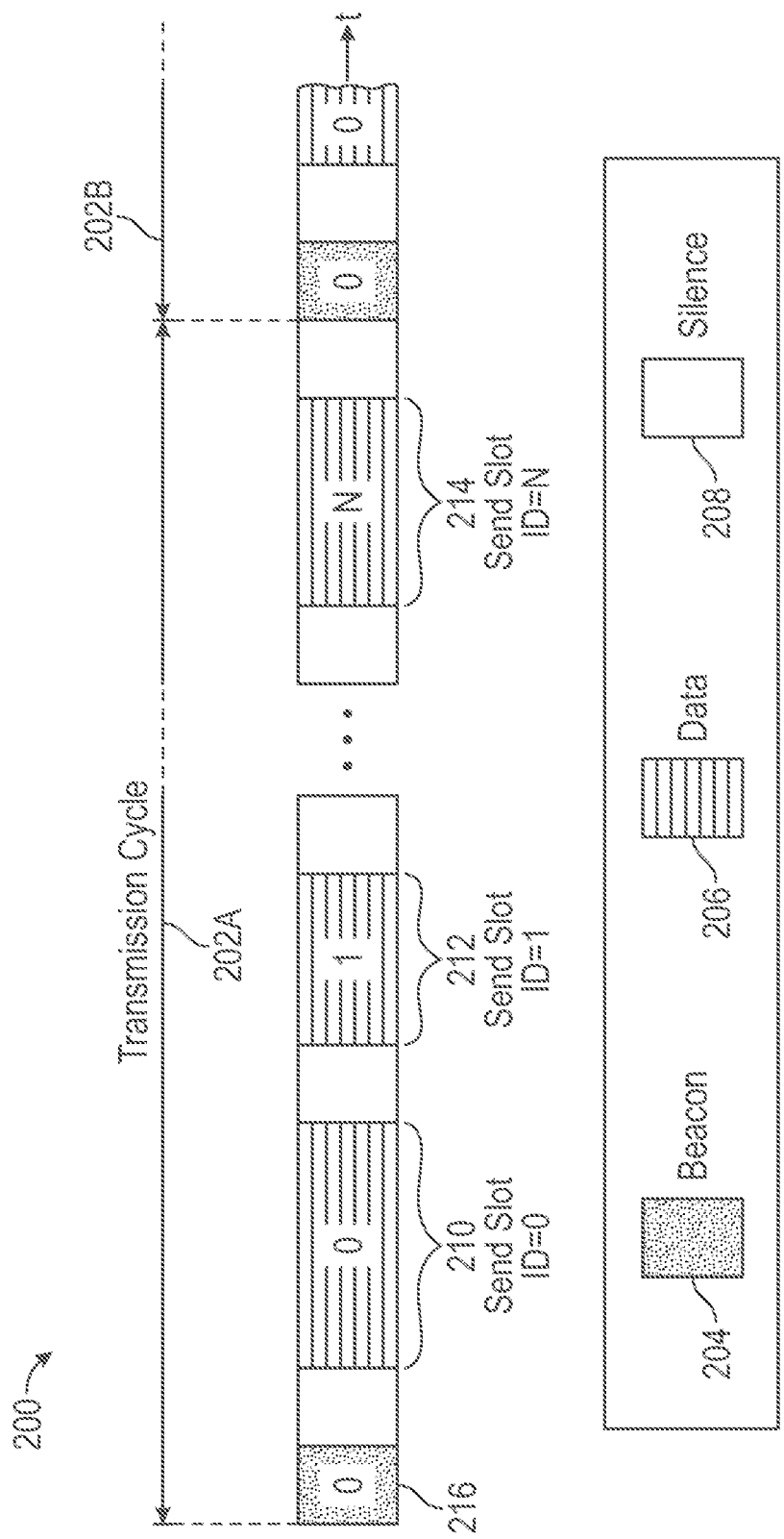
FIG. 2 is an illustration of an example transmission cycle, according to examples of the present disclosure.

FIG. 2 is an illustration 200 of example transmission cycle, according to examples of the present disclosure. The transmission cycle may be for network 100 of FIG. 1.

A first instance of a transmission cycle, 202A, may include send slots for each node of the network. If N nodes are in the network, N send slots may be included in a given transmission cycle. For example, transmission cycle 202A may include send slots 210, 212, 214. Each such send slot may be assigned to a given node. The send slot may be identified with an identifier (0 . . . N−1) that is unique for the transmission cycle. The identifier may identify a sender of the data packet. Each send slot may include up to a certain amount of data 206. As discussed further below, in some examples an assigned send slot might not have any data. The identifier may be included in data 206. The identifier may identify a sender of the data. In various examples, the send slot may be omitted for a given node under conditions discussed in further detail below. Send slots 210, 212, 214 may be separated by a period of silence 208. Each transmission cycle 202 may be initiated by a beacon 204. Beacon 204 may include a suitable piece of information to indicate that transmission cycle is beginning. Beacon 204 and send slot 210 may also be separated by a period of silence 208. Transmission cycle 202A may end and another transmission cycle 202B may begin. The participation by individual nodes in a given transmission cycle 202 may vary between transmission cycles.

Upon receipt of transmission cycle 202, a given node may parse it. Beacon 216 may be analyzed to determine that transmission cycle 202. Silence 208, or the absence of data, may be interpreted to determine that a separate data portion of transmission cycle 202 is to be received next. Data 206 may be analyzed to determine if data to or from a given node is included. The given node may insert its own data 206 into transmission cycle.

The transmission cycle may reflect use of PLCA to shape traffic in the network. PLCA may be specified in IEEE P802.3cg. PLCA may provide access fairness to nodes in the network. Access fairness may include the ability of each node to access the network in a given transmission cycle 202. However, PLCA does not provide bandwidth fairness or prioritization among the nodes. Bandwidth fairness might not be provided because, even though access fairness is provided, given nodes may insert more data into their packets than other nodes. Furthermore, access fairness cannot provide any prioritization among nodes. Examples of the present disclosure may provide bandwidth fairness and prioritization among the nodes. PLCA and enhancements thereof may be implemented in digital logic or instructions for execution in a network stack. PLCA and enhancements thereof may include hooks for firmware to observe and shape traffic.

With most implementations of a collision-based network, a maximum bandwidth utilization may be only 60%. Furthermore, without deterministic behavior, it might not be used for safety-critical applications. Instead, with PLCA, a network controller node, such as node 102, may organize network access on the physical layer. This may prevent collisions, provide deterministic behavior, and fully use bandwidth.

In FIG. 2, each PHY of respective nodes may be assigned a static ID (0 . . . N−1). The network controller node may have an ID of "0". The network controller node may send a beacon 204 starting a new transmission cycle. Upon receipt, each of the other nodes may have the opportunity to send data within a respective send slot 210, 212, 214 through respective PHY hardware or software. In one example, a node may pass or yield the opportunity to send data in a respective send slot 210, 212, 214. Other nodes may be configured to recognize that the given node has skipped its opportunity to send data if silence 208 exceeds a given threshold. Then, the next send slot may begin.

Figure 3:
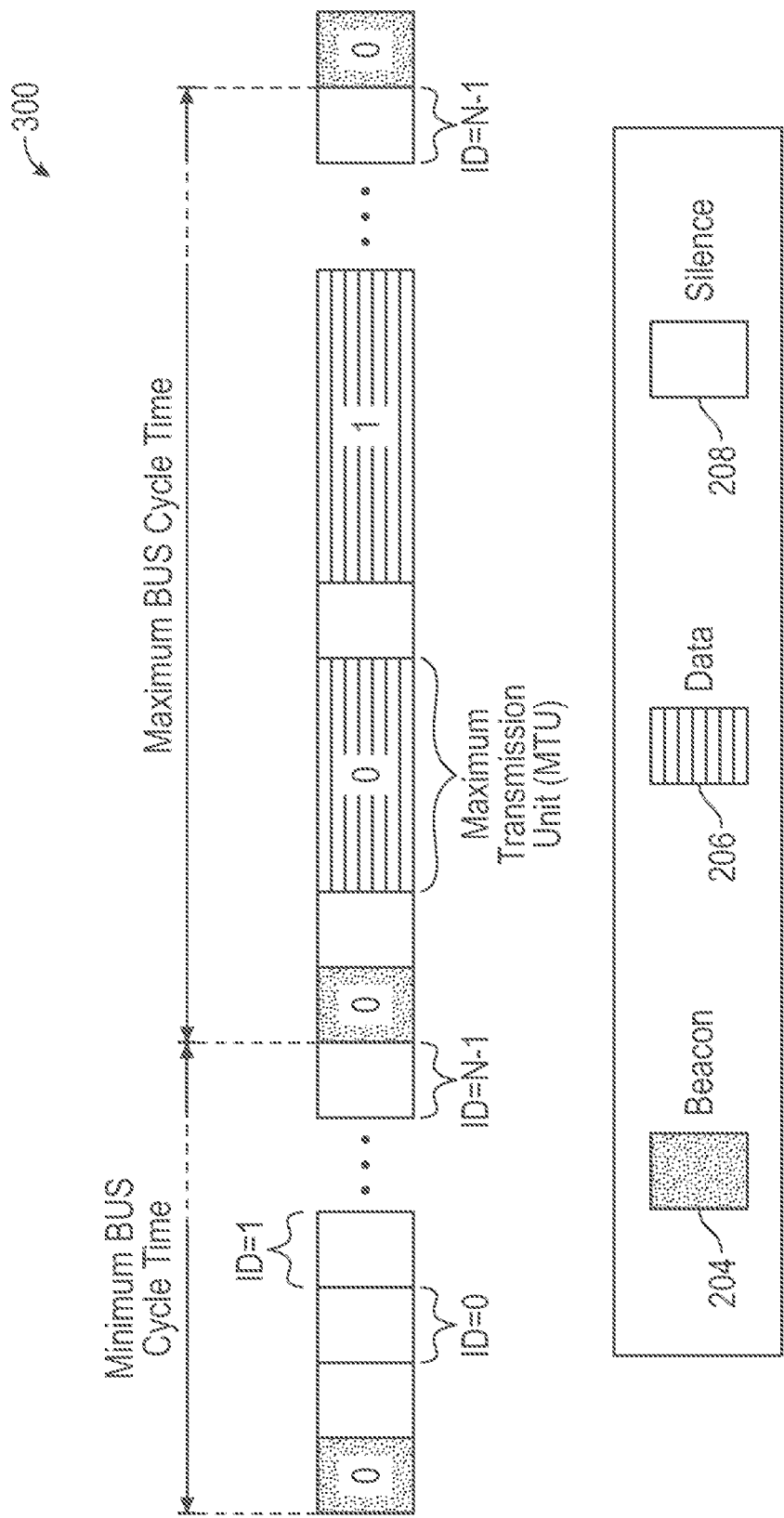
FIG. 3 is an illustration of timing of an example transmission cycle, according to examples of the present disclosure.

FIG. 3 is an illustration 300 of timing of an example transmission cycle, according to examples of the present disclosure. The minimum and maximum time to complete a transmission cycle or bus cycle can be calculated.

The minimum time needed to complete a complete transmission cycle may be given as $$\text{Minimum Bus Cycle Time} = t\text{Beacon} + (N+1)*t\text{Silence}$$

wherein tBeacon is the time needed for a beacon 204 to be issued, tSilence is the time needed for silence 208 between a pair of send slots, and N is the number of nodes or send slots. Such a minimum time would occur if all nodes yielded their opportunity to use their respective send slots. The value of tSilence is multiplied by (N+1) to account for a period of silence 208 after each of the N number of nodes and an additional period of silence 208 between the beacon 204 and a first send slot.

The maximum time needed to complete a complete transmission cycle may be given as $$\text{Maximum Bus Cycle Time} = t\text{Beacon} + (N+1)*t\text{Silence} + N*t\text{MTU}$$

wherein tBeacon is the time needed for a beacon 204 to be issued, tSilence is the time needed for silence between a pair of send slots, tMTU is time required to send the longest allowed data length (MTU—maximum transmission unit), N is the number of nodes or send slots. Such a maximum time would occur if all nodes used the maximum time between send slots to send its data (thus taking the full amount of silence), all nodes used their send slots to send data, and all nodes sent the maximum amount of data in their respective send slots. In one example, an MTU may be 64 bytes long. The silence 208 timeout periods may be included in this calculation because a given node might wait the duration of the silence timeout period before sending.

Sending of data—whether in the form of beacon 204 or data 206—in a given transmission cycle may cause EMI to be emitted by the node sending the data. The amount of EMI may vary according to the contents of the data that is emitted, the length of the data that is emitted, how often the transmission cycle repeats, the periodicity of the transmission cycle, or other suitable factors. Examples of the present disclosure may reduce EMI transmission by applying a delay at the end of a given transmission cycle.

Nodes 102, 104 may include output drivers (not shown) that can, for example, drive the communications bus on network medium 120 to other nodes 102, 104. Nodes 102, 104, when not enabled to generate output, may be in a high impedance idle or receive state. The transitions to and from these states, as well as the driver's own common-mode voltage input and output levels, may create an inherent common mode noise.

FIGS. 4-9 illustrate EMI generated by a 10SPE node in various conditions, according to examples of the present disclosure. In particular, the common mode noise of a given node 102, 104 is illustrated in FIGS. 4-9 under different conditions. While this common mode noise may be reduced by careful driver design, it might still occur. Moreover, changes to a driver design require changes to and, typically, increased die size.

A 10SPE system such as system 100 may rely on a periodically repeated beacon bit-pattern for its operation. This repetition period might get constant, such as in the cases of bus-idle or low bus utilization. As a result, the naturally occurring common mode noise of the driver causes energy build-up in the corresponding frequencies, which end up as EMI.

Figure 4:
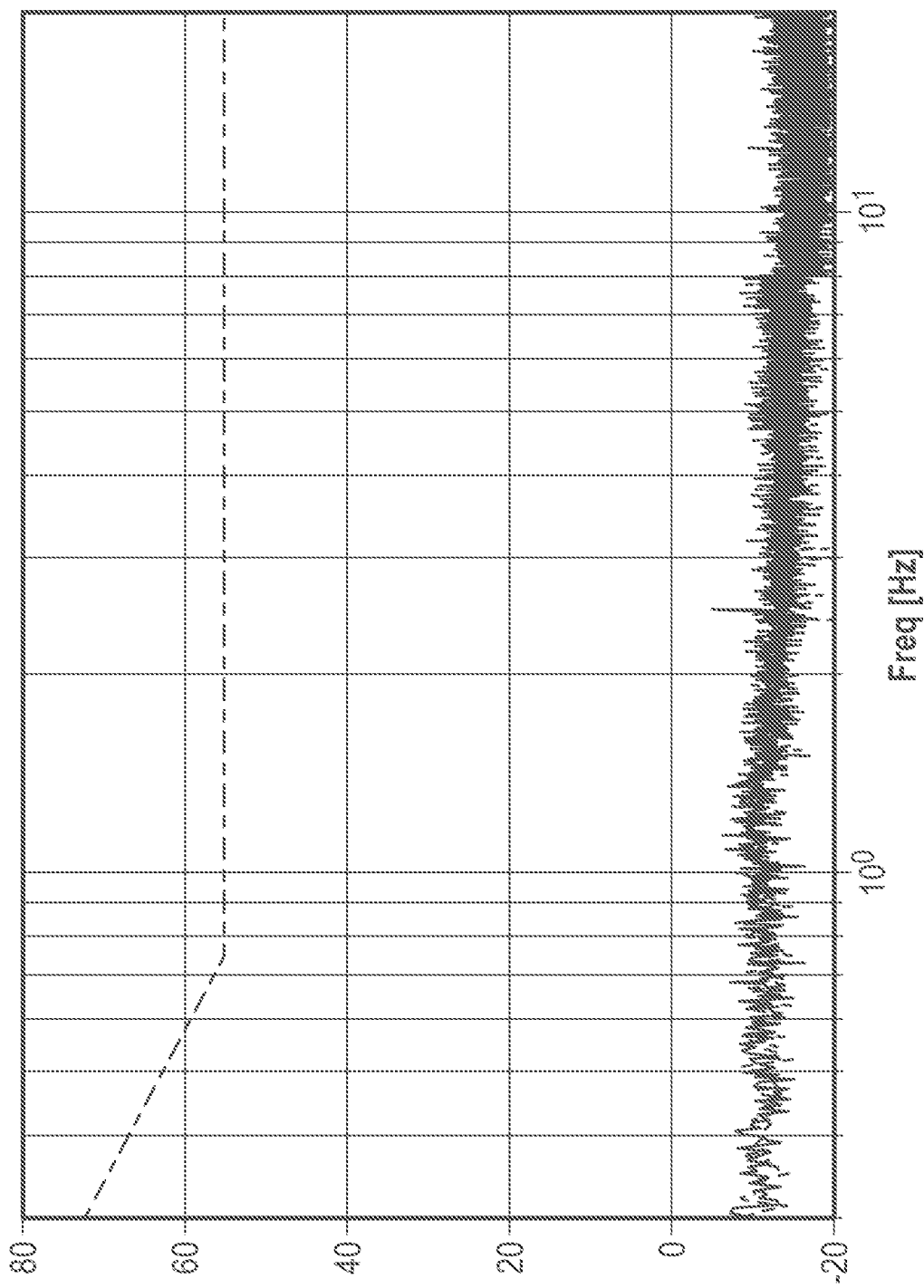
FIGS. 4-9 illustrate EMI generated by a 10SPE node in various conditions, according to examples of the present disclosure.

FIG. 4 illustrates EMI generated when the bus of network medium 120 between 10SPE nodes 102, 104 is completely idle. A limit of EMI noise is illustrated. The limit is represented by a line that varies in magnitude according to changes in frequency. This limit may be defined in any suitable manner, such as according to communications protocol or experimental data. The limit may define any suitable accepted limit above which EMI noise may be considered problematic for other equipment. The plot of data illustrated in FIG. 4 is the signal observed at a given node. When the noise on network medium 120 is sufficiently high, and the consequent signal exceeds this limit, the noise generated can be considered to be too high. In the case of FIG. 4, the noise does not come close to exceeding the limit.

Figure 5:
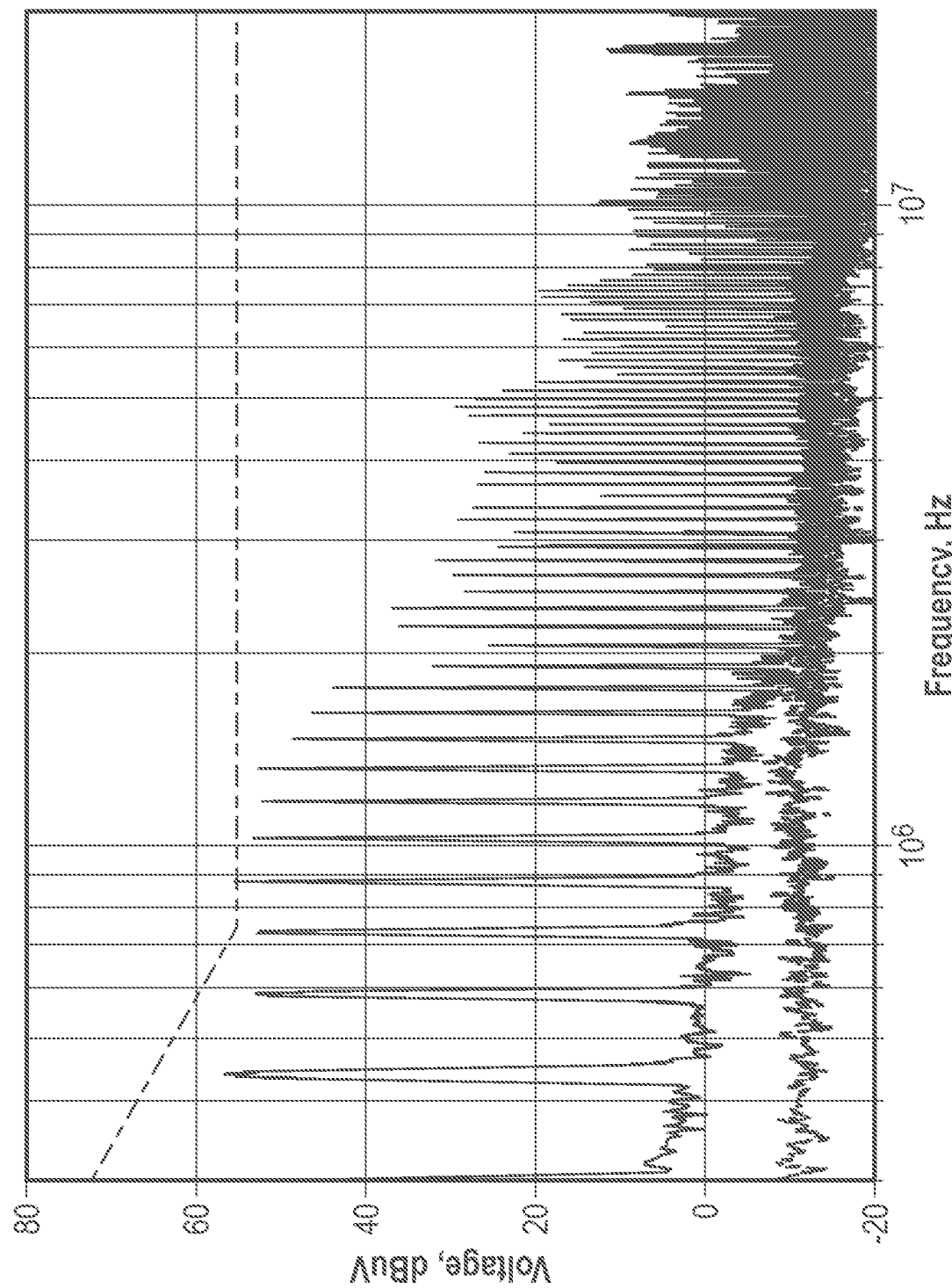

FIG. 5 illustrates EMI generated when 10SPE nodes 102, 104 are issuing transmission cycles, but no nodes are using their sending slots, leaving only a beacon signal at the start of each transmission cycle. Furthermore, in the example of FIG. 5, there may be one node instance, such as node 102.

As shown in FIG. 5, EMI interference approaches or even touches the limit line, reflecting unacceptably large noise. This noise may be in-band. In-band frequencies may include frequency ranges that are relevant or needed for proper data recovery, in contrast with out-of-band frequencies for which signals are not relevant or needed for data recovery. Simply filtering out in-band frequencies for noise might have the unwanted side effect of degrading the signal that needs to be used to indicate data. For example, if a signal is filtered for the frequency range of the in-band noise, then actual data carried by the signal may be filtered out. Thus, filtering for the kind of noise shown in FIG. 5 may be an inappropriate solution. This may be in contrast for filtering for out-of-band noise, which might be safely accomplished without degrading the data communicated in the signal.

Figure 6:
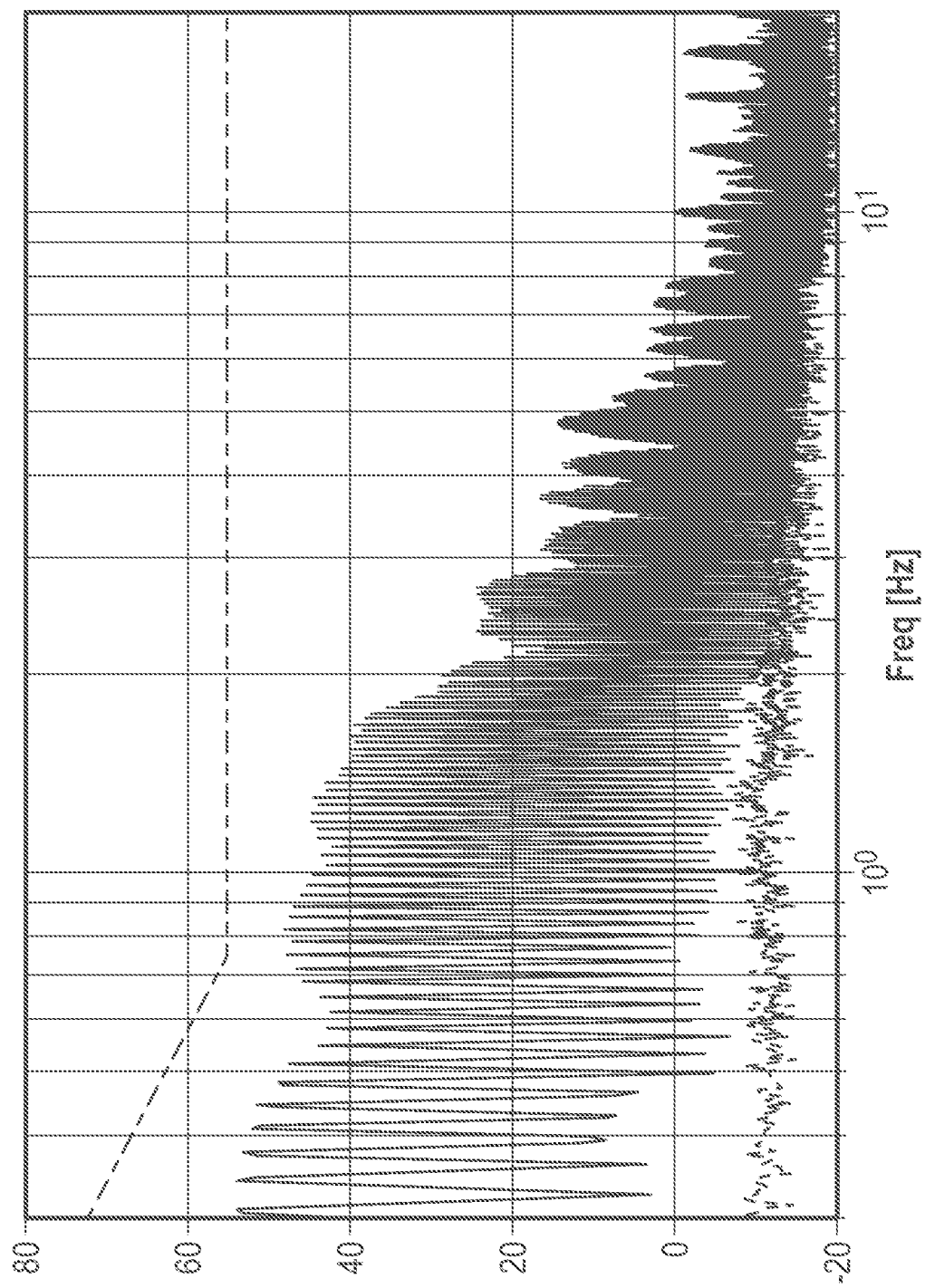

FIG. 6 illustrates EMI generated when the 10SPE nodes 102, 104 are issuing transmission cycles, but no nodes are using their sending slots, leaving only a beacon signal at the start of each transmission cycle. Furthermore, in the example of FIG. 6, there may be eight instances of nodes, such as node 102 and seven nodes 104.

As shown in FIG. 6, EMI interference might not be as severe as the EMI interference shown in FIG. 5. Thus, the EMI interference might be lessened if the period of the transmission cycle is longer, or if more nodes are used.

Figure 7:
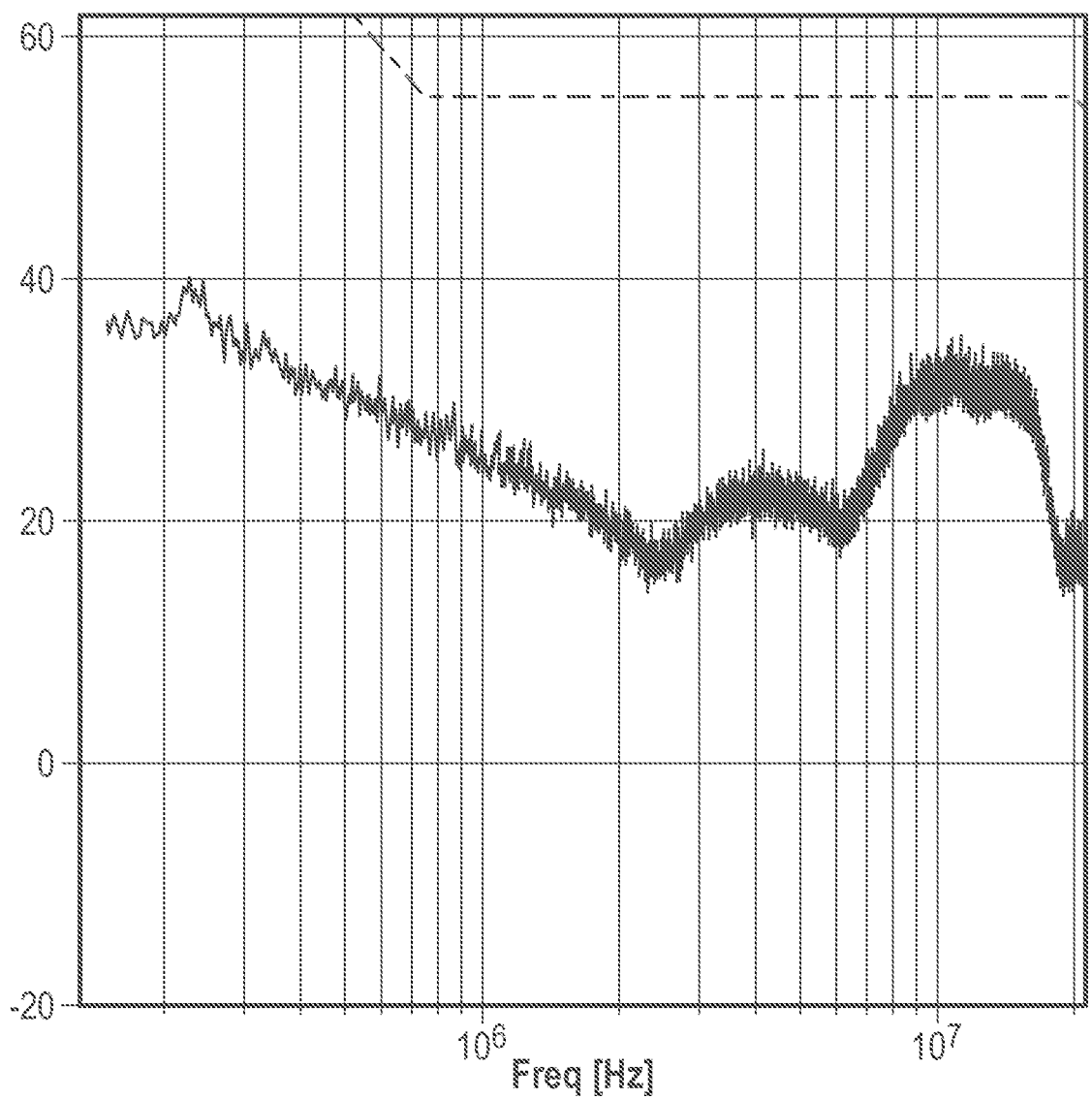

FIG. 7 illustrates EMI generated when 10SPE nodes 102, 104 in network medium 120 are issuing transmission cycles, wherein the nodes are using sending slots to send messages of a maximum length of data.

As shown in FIG. 7, EMI interference may be of an acceptably low level, below the limit line. Thus, the EMI interference might be lessened if nodes 102, 104 transmit longer messages.

Figure 8:
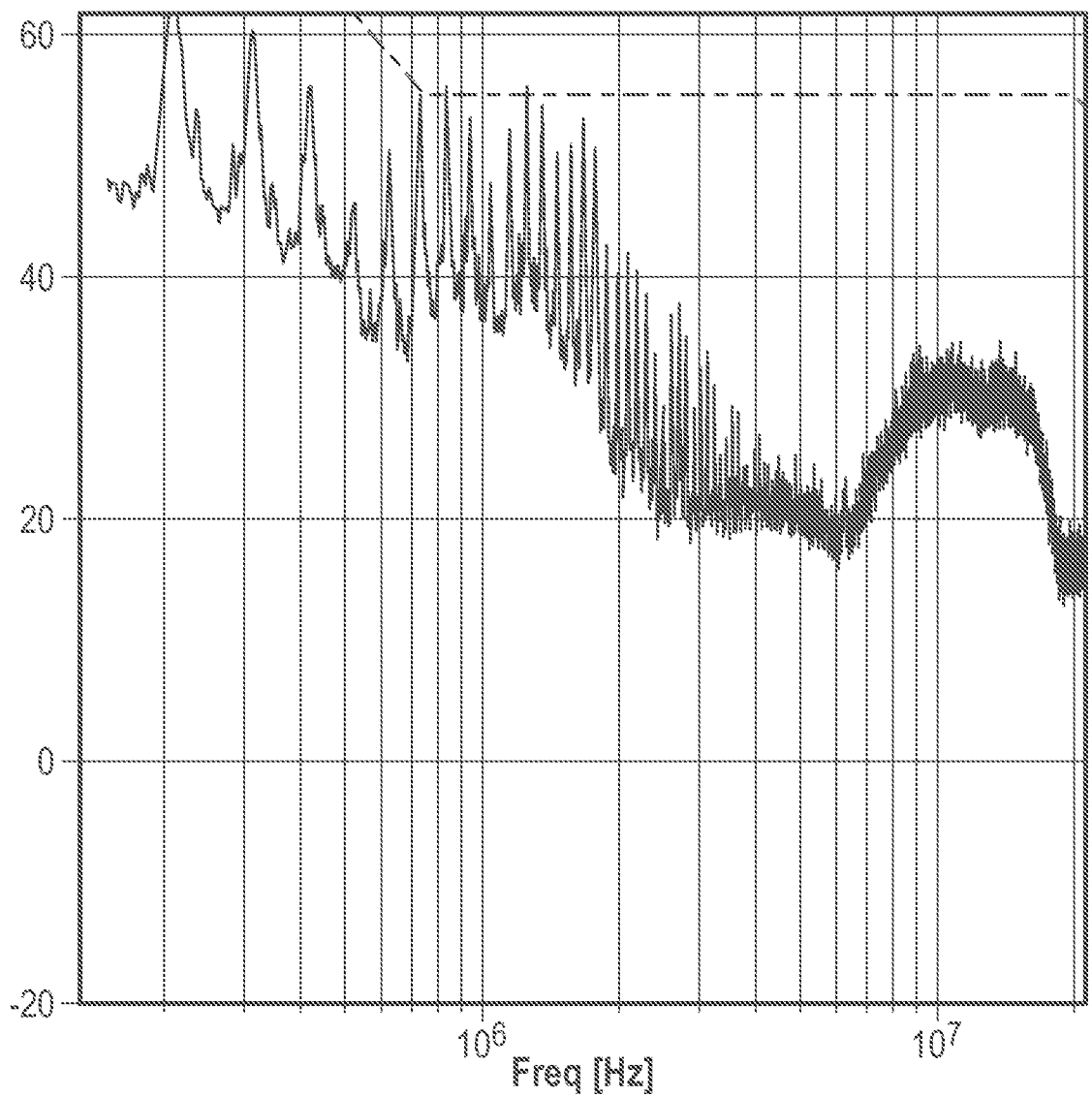

FIG. 8 illustrates EMI generated when 10SPE nodes 102, 104 in network medium 120 are issuing messages with short, non-empty data payloads, and there are two instances of nodes 102, 104, such as an instance each of node 102 and node 104. The short data payloads may be, for example 20% of the maximum allowed length.

As shown in FIG. 8, EMI interference approaches or even touches the limit line, reflecting unacceptably large noise. This noise may be in-band. This may occur even though the messages are longer than those in FIG. 5.

Figure 9:
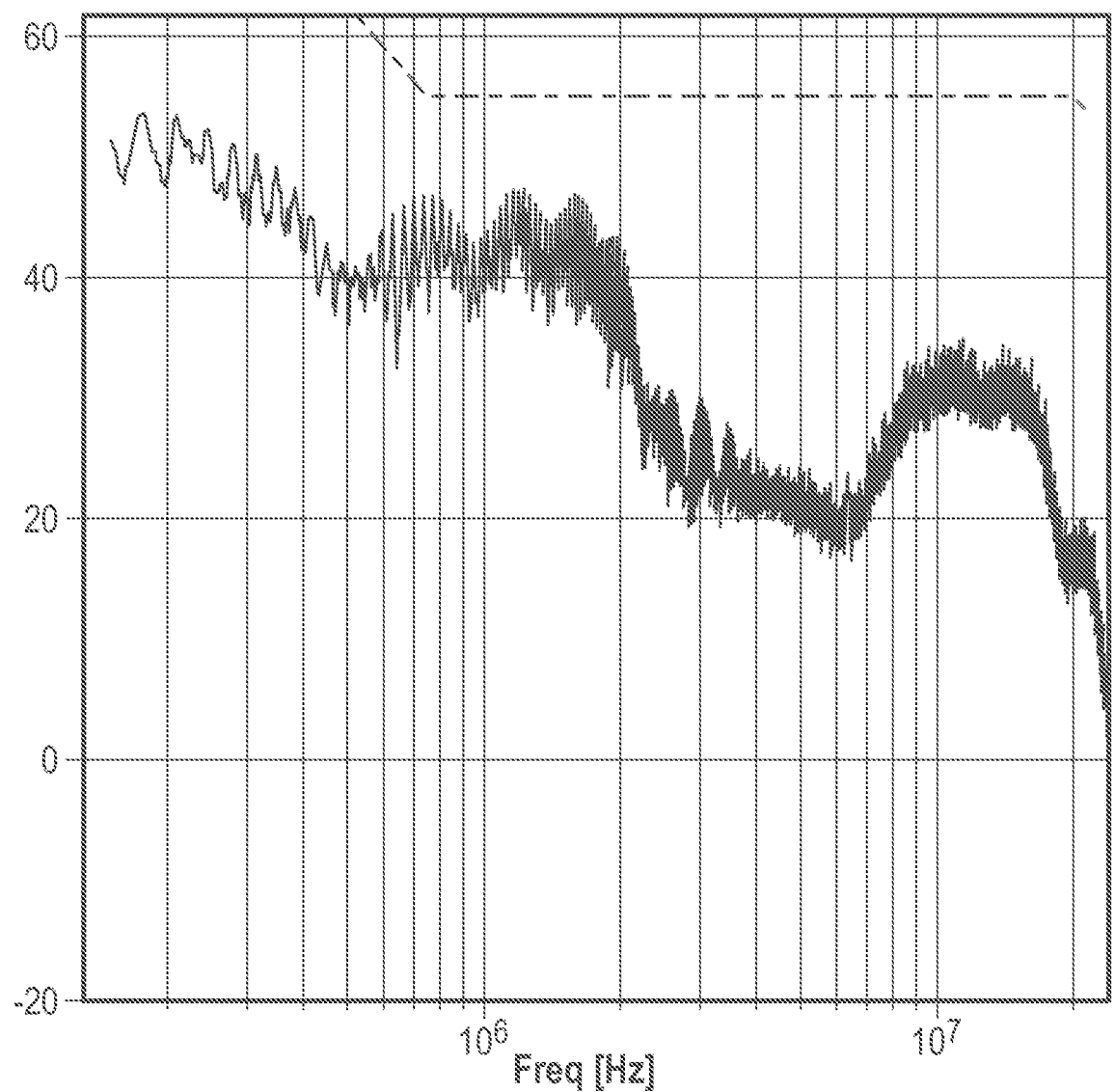

FIG. 9 illustrates EMI generated when 10SPE nodes 102, 104 in network medium 120 are issuing messages with short, non-empty data payloads, and there are eight instances of nodes, such as node 102 and seven nodes 104.

As shown in FIG. 9, EMI interference might be within an acceptable level. Thus, the EMI interference might not be as severe as shown in FIG. 8, wherein in FIG. 9 more nodes of the network transmit longer messages.

Accordingly, inventors of examples of the present disclosure have discovered that, in a bus system (such as 10SPE) utilizing an undriven idle state (such as empty transmit opportunities), a pattern that repeats at a constant rate (such as a beacon signal) can lead to increased EMI levels. As discussed above, the EMI may be caused by inherent common-mode variations originating from the transitions in nodes 102, 104 from idle states, to driven states, and back. Specifically, for PLCA implementation, in the cases of low-bus utilization, a repeating beacon pattern can become a significant EMI contributor if it occurs at a fixed rate.

In one example, control circuit 106A of network controller node 102 may be configured to perform temporal spreading or dithering of beacon signals. This may be performed on any suitable basis, such as in response to detected EMI, in response to potential EMI, or may be preventative or proactive in nature. In one example, the temporal spread may be achieved through adding delays at the end of each cycle. This may include adding such a delay before the start of a subsequent cycle. In a further example, the length of the delay could dynamically variable.

Accordingly, the temporal occurrence or periodicity of beacons may be modulated. In turn, this may have the effect of spreading the frequency footprint of the generated EMI noise, leading to lower peak values of EMI. In order not to compromise the bus/network bandwidth, the variable delay can be added only to cycles with no transmission or to transmissions such that would result in repetition of the previous transmission cycle length. The delay can be generated by any suitable function, such as by a random, pseudo-random, triangle, sawtooth, or ramp function. For example, the delay may be generated by a triangle function wherein the delay increases or decreases by one bit each cycle. The solution can be implemented as digital implementation, without need for optimization of inherently prone to variation analog changes. The overhead for implementation and validation is very small, but the expected impact on emissions is in the order of magnitude of 10 to 15 dB of improvement of emission levels in the critical regions.

Figure 10:
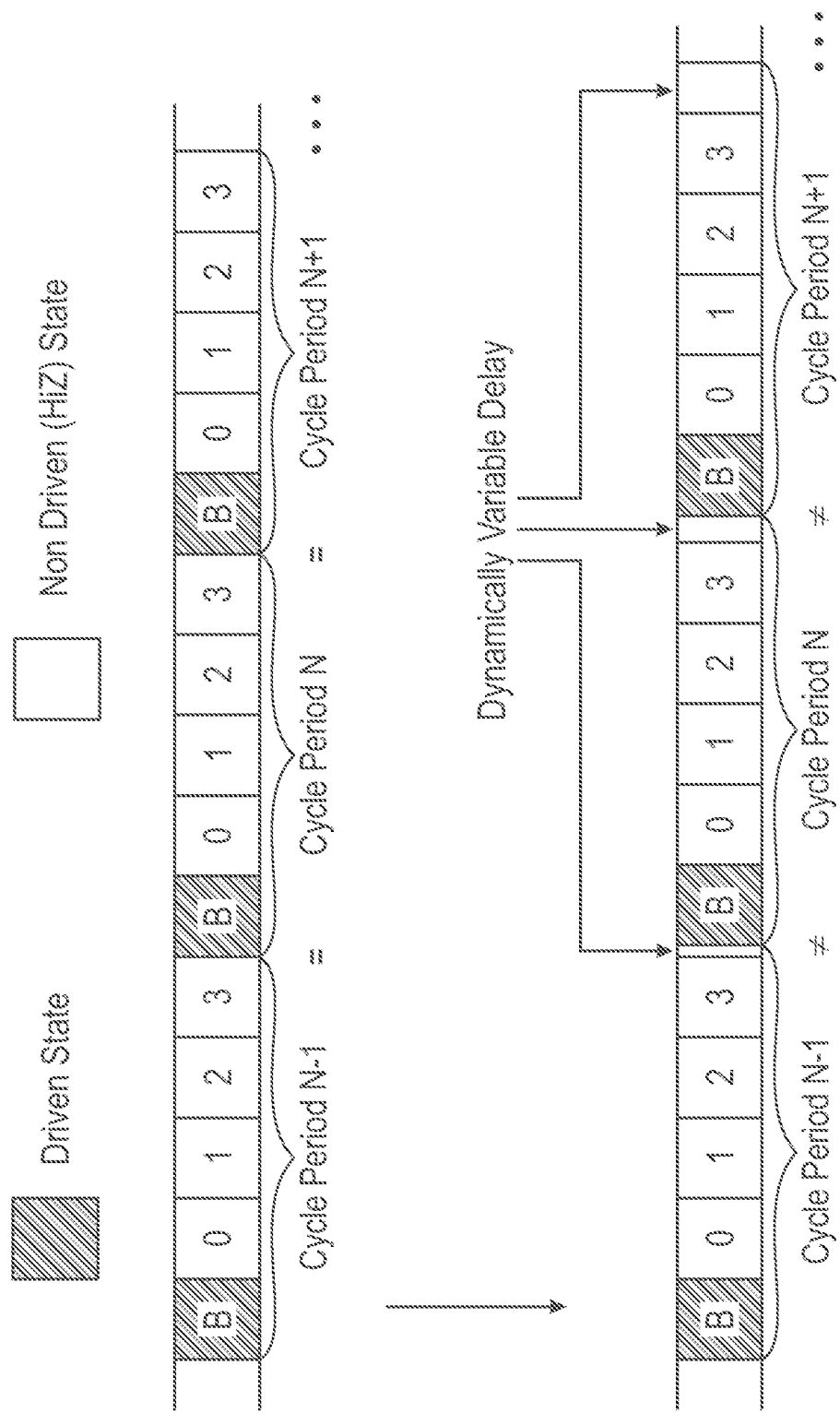
FIG. 10 is an illustration of a timing diagram of temporal spreading or dithering of beacons, according to examples of the present disclosure.

FIG. 10 illustrates timing diagrams of temporal spreading or dithering of beacons, according to examples of the present disclosure. The timing diagram of FIG. 10 may reflect operation of cycles generated by, for example, network controller node 102.

As discussed above, network controller node 102 may be configured to initiate transmission cycles by issuing beacon signals to the other nodes. Network controller node 102 may be configured to determine when to issue the beacon signal in a given transmission cycle.

Network controller node 102 may be configured to determine, for a given transmission cycle X, whether all of the other nodes 104 have completed all associated send slots in an immediately previous transmission cycle X−1, thus completing the other nodes' transmissions. Network controller node 102 may be configured to, based upon a determination of the completion of the other nodes' transmission in transmission cycle X−1, delay transmission of a beacon signal for transmission cycle X. This may be represented by a dynamically variable delay added to the end of transmission cycle X−1, thus delaying transmission cycle X by delaying the beacon used to start transmission cycle X.

Similarly, network controller node 102 may be configured to determine, for a given transmission cycle X+1, whether all of the other nodes 104 have completed all associated send slots in an immediately previous transmission cycle X, thus completing the other nodes' transmissions. Network controller node 102 may be configured to, based upon a determination of the completion of the other nodes' transmission in transmission cycle N, delay transmission of a beacon signal for transmission cycle X+1. This may be represented by the dynamically variable delay added to the end of transmission cycle X, thus delaying transmission cycle X+1 by delaying the beacon used to start transmission cycle X+1. The particular value of the dynamically variable delay used in this transmission cycle may be different than the particular value of the dynamically variable delay used in a previous or subsequent transmission cycle.

Such delays may be added to the end of any suitable number of cycles, such as X−1, X, and X+1 as shown in FIG. 10. The delay added to the end of cycles X−1, X, and X+1 may each be of a different value or length.

Network controller node 102 may be configured to delay transmission of the beacon signal for the given transmission cycle on a selective basis, wherein network controller node 102 may be configured to turn the insertion of the delay on or off. Network controller node 102 may be configured to delay transmission of the beacon signal for the given transmission cycle on any suitable basis. For example, network controller node 102 may be configured to selectively delay transmission of the beacon signal for the given transmission cycle based upon possible generation of EMI from any of nodes 102, 104. This may be predicted based upon, for example, a given number of repeated cycles of a given similar length, or a given number of repeated cycles of a same length that are below a given length. Moreover, settings for selectively delaying transmission of the beacon signal, such as a level of EMI or a quantity of cycles that are repeated, may be based on user or system settings and stored, for example, in a register (not shown).

In one example, network controller node 102 may be configured to selectively delay transmission of the beacon signal for a given transmission cycle (such as X+1) based upon two or more further immediately previous transmission cycles (X, X−1) having lengths shorter than a threshold. The specific threshold may be evaluated for a given system, and example threshold may be less than two nodes using their respective send slots. Another example threshold may be the quantity of a minimum length transmission cycle plus 10%. In another example, network controller node 102 may be configured to selectively delay transmission of the beacon signal for the given transmission cycle (such as X+1) based upon two or more further immediately previous transmission cycles (X−2, X−1) having lengths that are approximately equal and within a threshold difference of each other. Such a threshold may be, for example, whether the two lengths are within 10%, 5%, or 1% of each other. In yet another example, network controller node 102 may be configured to selectively delay transmission of the beacon signal for a given transmission cycle (such as X+1) based upon two or more further immediately previous transmission cycles (X, X−1) having lengths shorter than a threshold and that are approximately equal and within a threshold difference of each other. Such a threshold may be, for example, whether the two lengths are within 10%, 5%, or 1% of each other.

Network controller node 102 may be configured to set a delay of transmission of the beacon signal for a given transmission cycle (such as X+1) that is different than a non-zero delay of transmission of a beacon signal for the immediately previous transmission cycle (such as X). That is, the delay of cycle X+1 might be a non-zero delay that is different than a delay of cycle X that is also a non-zero delay. The amount of the delay may be any suitable value. Such suitable values may include values that vary from transmission cycle to transmission cycle. In one example, network controller node 102 may be configured to set a delay of transmission of the beacon signal for the given transmission cycle that is a random value. In another example, network controller node 102 may be configured to set a delay of transmission of the beacon signal for the given transmission cycle according to a periodic function.

For example, network controller node 102 may be configured to set a delay of transmission of the beacon signal for the given transmission cycle (X+1) according to a triangle function, wherein the delay between any two given transmission cycles varies only by a small amount. The delay of transmission of the beacon signal for the given transmission cycle (X+1) is longer than a delay of transmission of a beacon signal for the immediately previous transmission cycle (X), wherein the delay of transmission of the beacon signal for the immediately previous transmission cycle (X) was longer than a delay of transmission of a beacon signal for a further immediately previous transmission cycle (X−1). This process may continue until the delay reaches a peak value at, for example, a time Y. Subsequently, network controller node 102 may be configured to set a delay of transmission of the beacon signal for another given transmission cycle (Y+1) further according to the triangle function, wherein the delay of transmission of the beacon signal for the given transmission cycle (Y+1) is shorter than a delay of transmission of a beacon signal for the immediately previous transmission cycle (Y). The delay of transmission of the beacon signal for the next transmission cycle (Y+2) will be shorter than the delay of transmission of a beacon signal for the given transmission cycle (Y+1). This may continue until the delay reaches a minimum value, and the delay may be incrementally increased thereafter. Similarly, a sawtooth function, ramp function, a reverse ramp function, a sinusoidal function, a random function, or a pseudo-random function could be used.

While the length of the delay provided by network controller node 102 may be variable, the maximum length of the delay may be shorter than a length of time for an unused send slot for one of the other nodes.

In one example, network controller node 102 may be configured to set a delay of transmission of the beacon signal for a given transmission cycle (such as X+1) by adding additional send slots to the immediately previous transmission cycle (X). For example, an additional send slot may be added to each transmission cycle, until a maximum is reached, wherein the send slots may be reduced to an original value.

In one example, network controller node 102 may be configured to set a delay of transmission of the beacon signal for a given transmission cycle by increasing a representation of a quantification of the number of nodes 104 in system 100. For example, system 100 might include 10 instances of nodes 104. Each node 104 may know from a setting, such as MaxID, that there are 10 instances of nodes 104. Each node 104 may use this information to know when its transmission slot will be. MaxID may be a quantification of the total number of nodes 104 and network controller node 102. Network controller node 102 may be configured to delay transmission of a beacon signal for a given transmission cycle X by increasing the MaxID for that transmission cycle beyond a value that is actually necessary to represent the number of nodes in network 100. Each node 104 may then expect that the transmission cycle will terminate after a larger number of nodes has had a transmit opportunity or sending slot.

Figure 11:
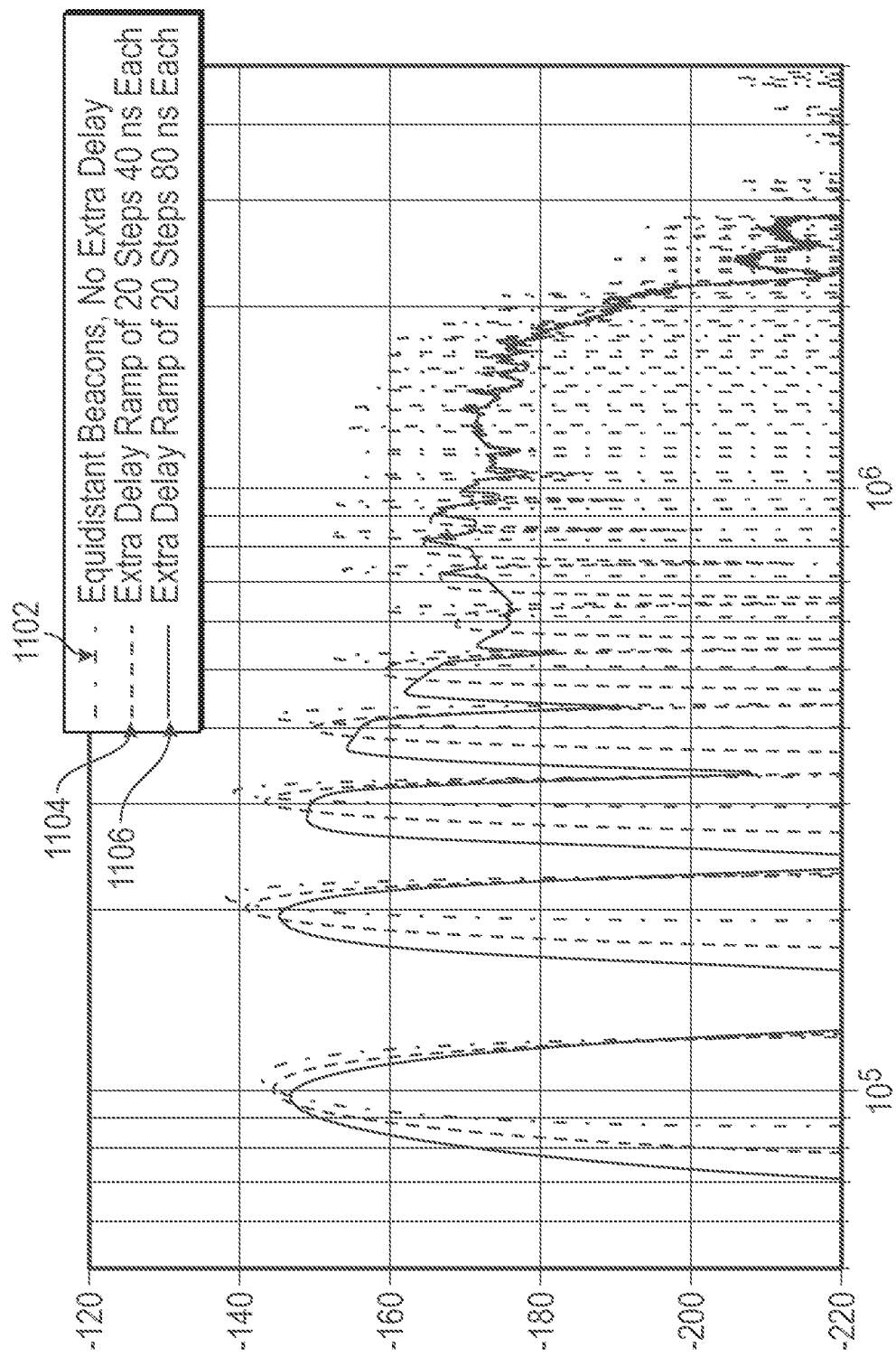
FIGS. 11-12 illustrate noise reduction of EMI from temporal spreading or dithering of beacons, according to examples of the present disclosure.
Figure 12:
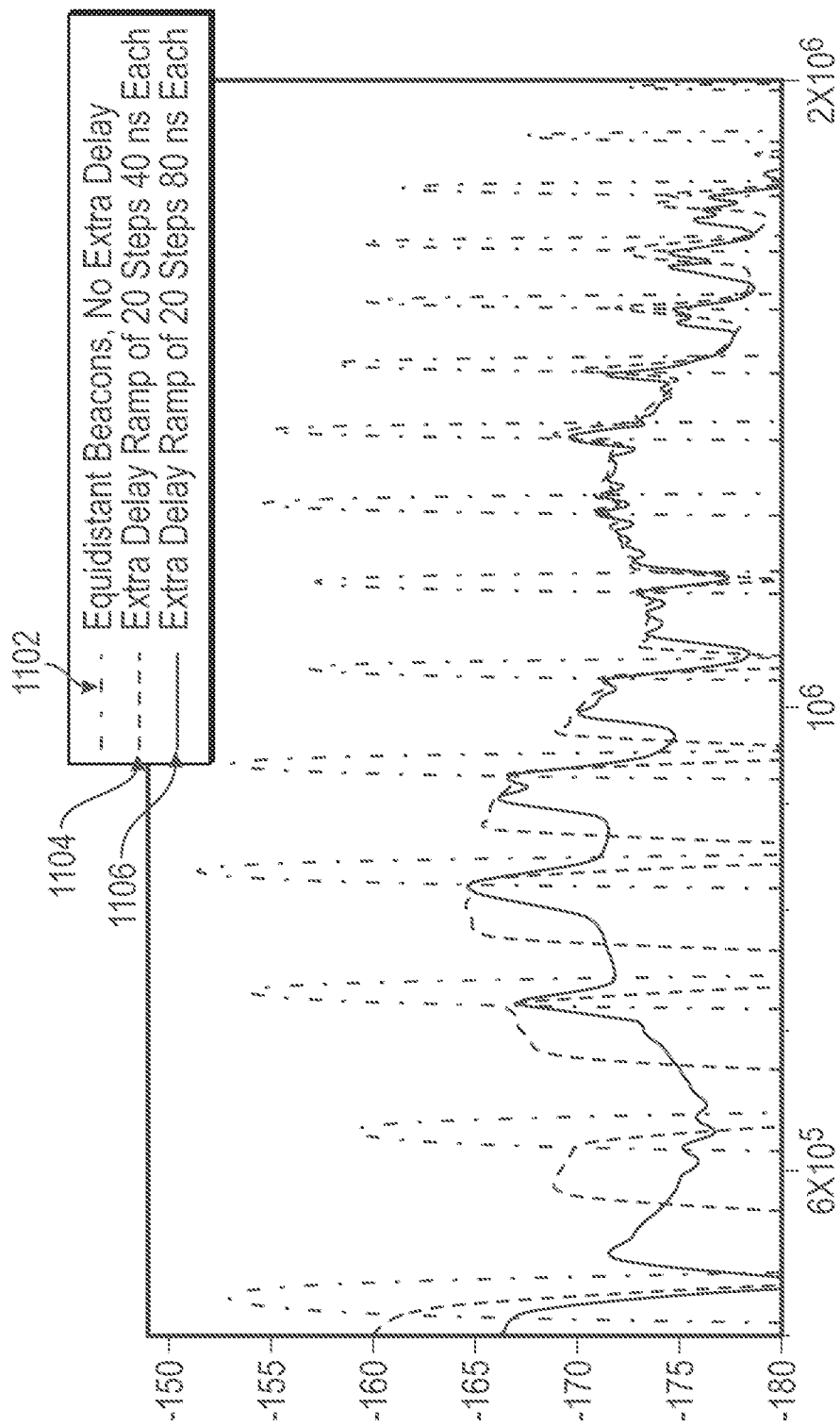

FIGS. 11-12 illustrate noise reduction of EMI from temporal spreading or dithering of beacons, according to examples of the present disclosure. FIG. 11 illustrates the EMI generated by different configurations of network controller node 102 to perform temporal spreading or dithering of beacons. FIG. 12 may be a more detailed view of FIG. 11.

As shown in FIGS. 11-12, in a first plot 1102 the highest peaks of EMI may arise from repetitive messages in network medium 120 issued without temporal spreading or dithering of beacons. In a second plot 1104 and third plots 1106, temporal spreading or dithering of beacons may have been applied. For example, a delay may have been added to the end of each transmission cycle. The delay may have been varied from cycle to cycle through use of a triangle function. In the second and third plots 1104, 1106, a triangle function with a period of 20 cycles or steps may have been used to generate the delay. In the second plot 1104, the triangle function may have included delay steps of 40 ns each. Thus, the delay added to cycles would be progressively selected from {0 ns, 40 ns, 80 ns, 120 ns, . . . 760 ns, 800 ns, 760 ns, 720 ns . . . 80 ns, 40 ns, 0 ns, 40 ns, 80 ns . . . }. In the third plot 1106 the triangle function may have included delay steps of 80 ns each. Thus, the delay added to cycles would be progressively selected from {0 ns, 80 ns, 160 ns, 240 ns, . . . 1520 ns, 1600 ns, 1520 ns, . . . 80 ns, 0 ns, 80 ns . . . }.

As shown in FIGS. 11-12, both the second and third plots 1104, 1106 demonstrate decreased EMI by adding variable delays to each transmission cycle, compared to the first plot 1102. However, the difference between the second plot 1104 and the third plot 1106 may illustrate diminished returns for EMI reduction with increased step widths of the example delays between 40 ns and 80 ns. The specific function to create the delay—such as triangle, ramp, sawtooth, or random—as well as the parameters of such a specific function—such as step size, or step count—may be evaluated in specific implementations in view of effectiveness and other design considerations. For example, while the 80 ns step size illustrated in third plot 1106 does further decrease EMI compared to the 40 ns step size illustrated in the second plot 1104, it does so at a cost of further latency. Each variable delay increases the latency of a transmission cycle and thus reduced the bandwidth of network medium 120.

Furthermore, inventors of examples of the present disclosure have found that when the differences between subsequent delays are substantially large, diminished returns for EMI reduction, or even increases in EMI, may occur if the difference between two subsequent delays are sufficiently large. For example, if a ramp function is used to generate delays, at the peak of the ramp function, the delay generated may be 800 ns. The next delay value returned by the ramp function may be 0 ns. The difference in these two generated delays—800 ns—may be much greater than other functions, such as the triangle function. Use of the triangle function may provide benefits for synchronization.

Examples of the present disclosure might be implemented by making digital logic or software changes to existing implementations of nodes 102, 104. Such changes may work with existing analog front-ends or other components. Furthermore, examples of the present disclosure might operate within systems using existing 10SPE specifications. Moreover, implementations of examples of the present disclosure might be made in network controller node 102, without necessitating changes to nodes 104.

Figure 13:
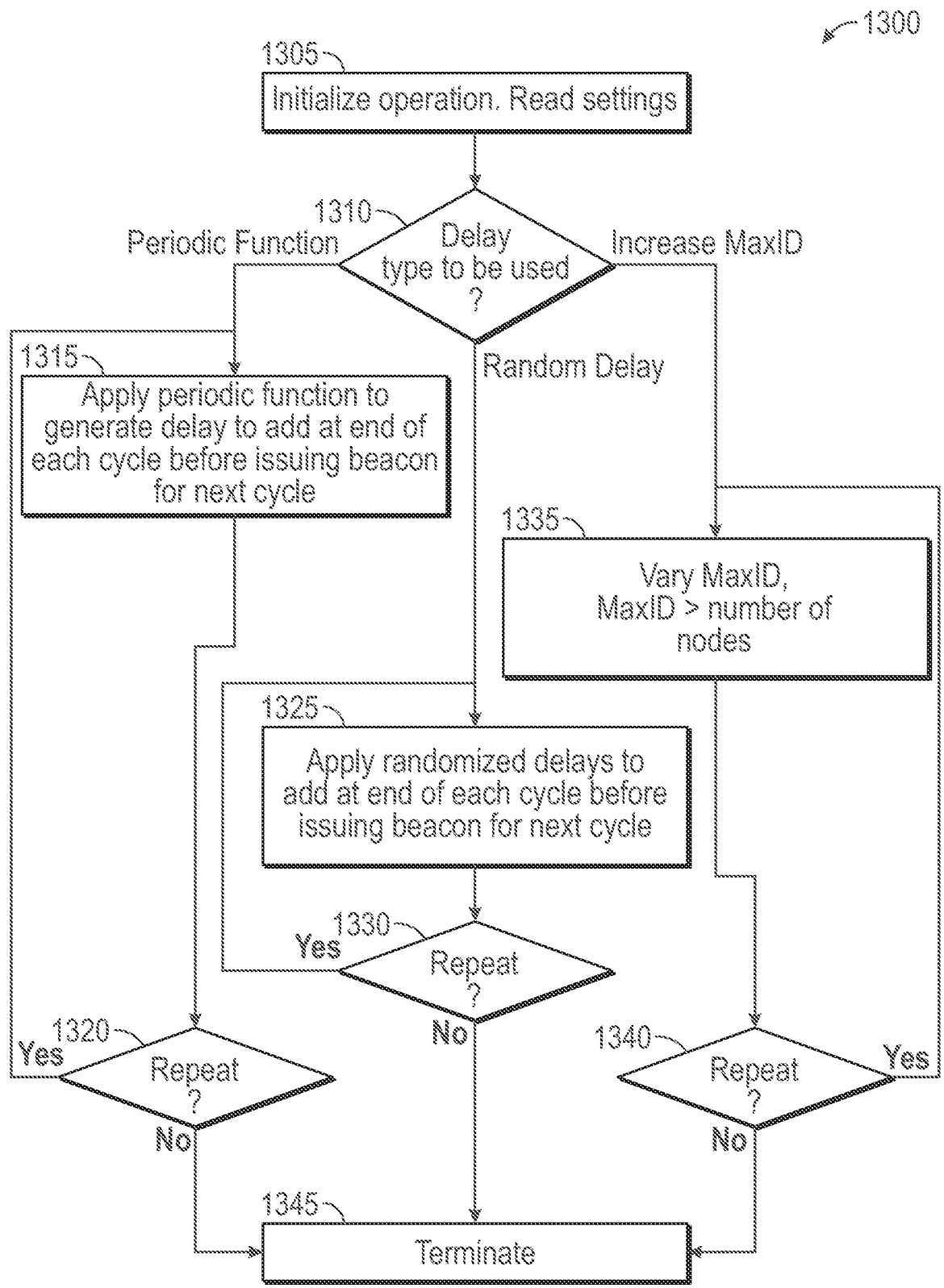
FIG. 13 illustrates an example method for temporal spreading or dithering of beacons, according to examples of the present disclosure.

FIG. 13 is an illustration of example method 1300 for temporal spreading or dithering of beacons, according to examples of the present disclosure. Method 1300 may be implemented by, for example, system 100 and particularly by network controller node 102. Furthermore, method 1300 may be performed by control circuit 106A of network controller node 102. Method 1300 may include more or fewer blocks than shown in FIG. 13. The blocks of method 1300 may be performed in any suitable order, and blocks may be optionally repeated, performed recursively, or omitted.

At block 1305, operation of the method may be initialized. System or operation preferences, such as specifications of noise remediation may be read. These may include, for example, a specification of a delay type to be applied. These preferences may be specified by a user, maker, or software of a system and provided in memory, or in hardware, such as through fuses.

At block 1310, it may be determined what type of temporal spreading or dithering of beacons will be performed. Specifically, the type of delay to be used may be determined. If a periodic function is to be performed, method 1300 may proceed to block 1315. If a random delay is to be performed, method 1300 may proceed to block 1325. If a variance in the expected number of nodes in the system, represented by a value of MaxID, is to be performed, then method 1300 may proceed to block 1335.

At block 1315, a periodic function, such as a triangle, ramp, sawtooth, sinusoidal, or other function may be used to generate one or more delays. An amplitude, step size, number of steps, number of periods, or other parameters may be determined from system or user settings. The function may be used to generate delays that vary in size and add each variable delay to the end of the transmission cycles. This may be performed for a given number of cycles. Method 1300 may proceed to block 1320. At block 1320, it may be determined whether temporal spreading or dithering will continue. If so, method 1300 may repeat at, for example, block 1315. Otherwise, method 1300 may proceed to block 1345.

At block 1325, a random may be used to generate one or more delays. The length of the delay may be randomly selected between zero and a maximum delay length. The maximum delay length might be set at, for example, the time required for a minimum size of a sending slot for a node 104. A given number of cycles to perform the delay may be determined from system or user settings. The delays may vary in size and be added to the end of the transmission cycles. This may be performed for a given number of cycles. At block 1330, it may be determined whether temporal spreading or dithering will continue. If so, method 1300 may repeat at, for example, block 1325. Otherwise, method 1300 may proceed to block 1345.

At block 1335, an indication a number of nodes of the system may be varied. The indication may be given as MaxID. The MaxID value may be varied for a given number of cycles. The result may be that the nodes of the system wait an additional amount of time according to increases in the value of MaxID. At block 1340, it may be determined whether temporal spreading or dithering will continue. If so, method 1300 may repeat at, for example, block 1335. Otherwise, method 1300 may proceed to block 1345.

At block 1345, method 1300 may terminate.

Figure 14:
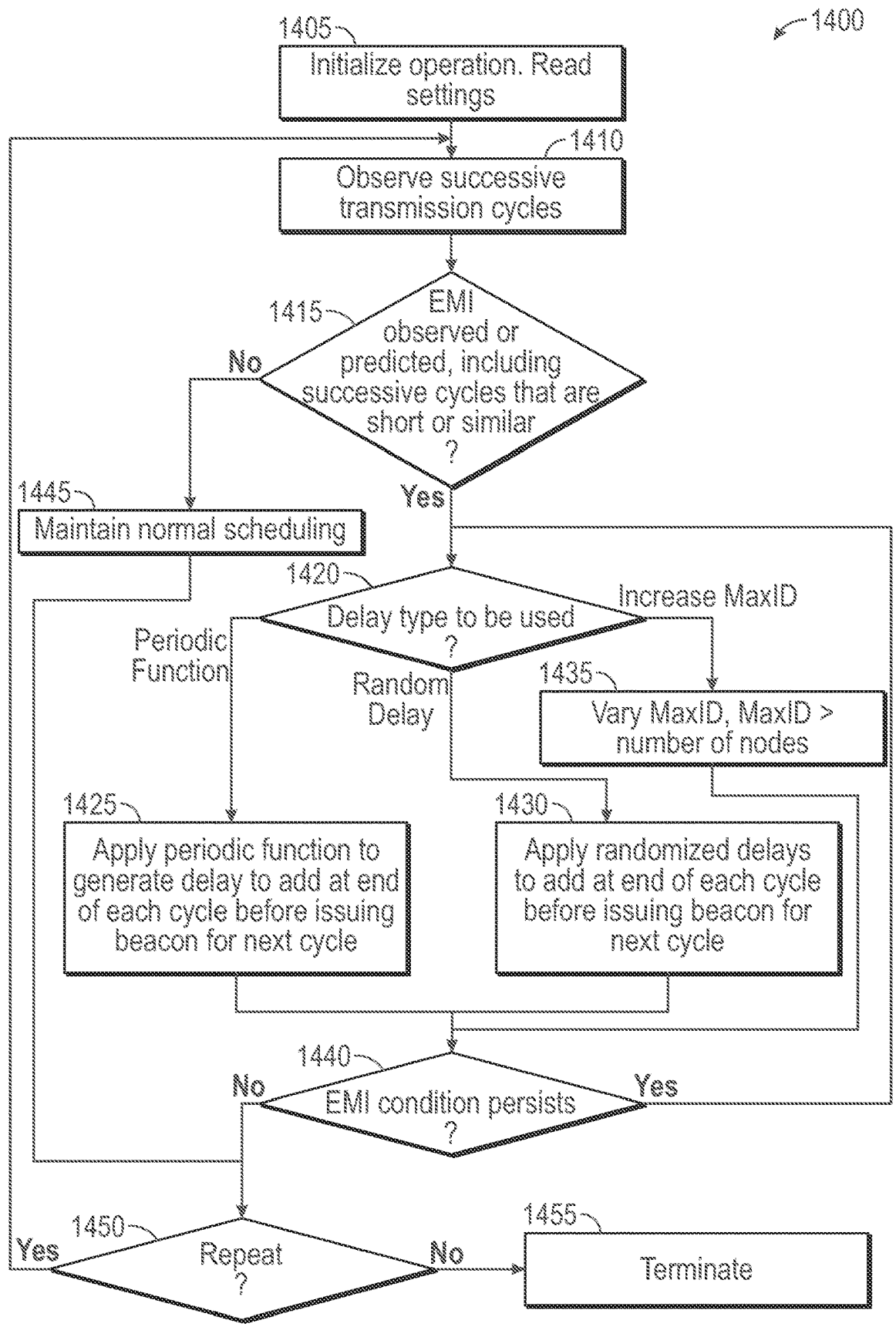
FIG. 14 illustrates an example method for temporal spreading or dithering of beacons, wherein temporal spreading or dithering of beacons may be selectively applied, according to examples of the present disclosure.

FIG. 14 is an illustration of example method 1400 for temporal spreading or dithering of beacons, wherein temporal spreading or dithering of beacons may be selectively applied, according to examples of the present disclosure. Method 1400 may be implemented by, for example, system 100 and particularly by network controller node 102. Furthermore, method 1400 may be performed by control circuit 106A of network controller node 102. Method 1400 may include more or fewer blocks than shown in FIG. 14. The blocks of method 1300 may be performed in any suitable order, and blocks may be optionally repeated, performed recursively, or omitted.

At block 1405, operation of the method may be initialized. System or operation preferences, such as definitions of levels of noise such as EMI may be read. Moreover, available remediation for noise may be read, such as a delay type to be applied, may be read. These preferences may be specified by a user, maker, or software of a system. These may be provided in memory, such as in a register, or in hardware, such as through fuses.

At block 1410, successive transmission cycles in a network may be observed. The length of the transmission cycles may be observed, as well as the similarity of transmission cycles to each other.

At block 1415, it may be determined whether temporal spreading or dithering of beacons is to be used. This may be determined on the basis of whether a threshold level of EMI has been detected. Moreover, this may be determined on the basis of whether a threshold level of EMI has been predicted. In various examples, this may include determining that a threshold number of successive cycles have been observed that are each under a threshold size or are within a threshold amount of similarity. In still other examples, such as shown in FIG. 13, temporal spreading or dithering of beacons might be enabled to be used regardless of whether EMI has been detected or predicted. If EMI is observed or predicted, temporal spreading or dithering of beacons may be used. If temporal spreading or dithering of beacons is to be used, method 1400 may proceed to block 1420. Otherwise, method 1400 may proceed to block 1445.

At block 1420, it may be determined what type of temporal spreading or dithering of beacons will be performed. Specifically, the type of delay to be used to implement the temporal spreading or dithering of beacons may be determined. If a periodic function is to be performed, method 1400 may proceed to block 1425. If a random delay is to be performed, method 1400 may proceed to block 1430. If a variance in the expected number of nodes in the system, represented by a value of MaxID, is to be performed, then method 1400 may proceed to block 1435.

At block 1425, a periodic function, such as a triangle, ramp, sawtooth, sinusoidal, or other function may be used to generate one or more delays. An amplitude, block size, number of blocks, number of periods, or other parameters may be determined from system or user settings. The function may be used to generate delays that vary in size and add each variable delay to the end of the transmission cycles. This may be performed for a given number of cycles. Method 1400 may proceed to block 1440.

At block 1430, a random function may be used to generate one or more delays. The length of the delay may be randomly selected between zero and a maximum delay length. The maximum delay length might be set at, for example, the time required for a minimum size of a sending slot for a node 104. A given number of cycles to perform the delay may be determined from system or user settings. The delays may vary in size and be added to the end of the transmission cycles. This may be performed for a given number of cycles. Method 1400 may proceed to block 1440.

At block 1435, an indication a number of nodes of the system may be varied. The indication may be given as MaxID. The MaxID value may be varied for a given number of cycles. The result may be that the nodes of the system wait an additional amount of time according to increases in the value of MaxID. Method 1300 may proceed to block 1440.

At block 1440, it may be determined whether temporal spreading or dithering of beacons is to continue. The determinations may be made in the same manner as determined in block 1410. If so, method 1400 may return to block 1420, or to the previously selected one of blocks 1425, 1430, 1435. If not, method 1400 may proceed to block 1450.

At block 1445, normal cycle and beacon scheduling may be maintained. Method 1400 may proceed to block 1450.

At block 1450, it may be determined whether method 1400 is to continue. If so, method 1400 may repeat at, for example, block 1410. Otherwise, at block 1455, method 1400 may terminate.

Although examples have been described above, other variations and examples may be made from this disclosure without departing from the spirit and scope of these examples.

What is claimed is:

1. An apparatus, comprising:
 a network interface configured to communicatively couple the apparatus to one or more other nodes in a network; and
 a control circuit configured to:
  repeatedly issue transmission cycles to the other nodes through the network interface, wherein a given transmission cycle includes a least one send slot for each of the other nodes to send data;
initiate transmission cycles by issuing beacon signals to the other nodes; and
determine when to issue a beacon signal in a given transmission cycle, including:
a determination that all of the other nodes have completed all associated send slots in an immediately previous transmission cycle, thus completing the other nodes' transmission; and
based upon a determination of the completion of the other nodes' transmission, delay transmission of the beacon signal for the given transmission cycle;
wherein the control circuit is further configured to set a delay of transmission of the beacon signal for the given transmission cycle according to a function, wherein the delay of transmission of the beacon signal for the given transmission cycle is longer than a delay of transmission of a beacon signal for the immediately previous transmission cycle, wherein the delay of transmission of the beacon signal for the immediately previous transmission cycle was longer than a delay of transmission of a beacon signal for a further immediately previous transmission cycle.

2. The apparatus of claim 1, wherein the control circuit is further configured to selectively delay transmission of the beacon signal for the given transmission cycle based upon possible generation of electromagnetic interference from the apparatus or the other nodes.

3. The apparatus of claim 1, wherein the control circuit is further configured to selectively delay transmission of the beacon signal for the given transmission cycle based upon two or more further immediately previous transmission cycles having lengths shorter than a threshold.

4. The apparatus of claim 1, wherein the control circuit is further configured to selectively delay transmission of the beacon signal for the given transmission cycle based upon two or more further immediately previous transmission cycles having lengths that are within a threshold difference of each other.

5. The apparatus of claim 1, wherein the control circuit is further configured to set a delay of transmission of the beacon signal for the given transmission cycle that is different than a non-zero delay of transmission of a beacon signal for the immediately previous transmission cycle.

6. The apparatus of claim 1, wherein the control circuit is further configured to set a variable delay of transmission of the beacon signal for the given transmission cycle.

7. The apparatus of claim 1, wherein the control circuit is further configured to set a delay of transmission of the beacon signal for the given transmission cycle that is a random value.

8. An apparatus, comprising:
a network interface configured to communicatively couple the apparatus to one or more other nodes in a network; and
a control circuit configured to:
repeatedly issue transmission cycles to the other nodes through the network interface, wherein a given transmission cycle includes a least one send slot for each of the other nodes to send data;
initiate transmission cycles by issuing beacon signals to the other nodes; and
determine when to issue a beacon signal in a given transmission cycle, including:
a determination that all of the other nodes have completed all associated send slots in an immediately previous transmission cycle, thus completing the other nodes' transmission; and
based upon a determination of the completion of the other nodes' transmission, delay transmission of the beacon signal for the given transmission cycle;
wherein the control circuit is further configured to set a delay of transmission of the beacon signal for the given transmission cycle according to a function, wherein the delay of transmission of the beacon signal for the given transmission cycle is shorter than a delay of transmission of a beacon signal for the immediately previous transmission cycle, wherein the delay of transmission of the beacon signal for the immediately previous transmission cycle was shorter than a delay of transmission of a beacon signal for a further immediately previous transmission cycle.

9. An apparatus, comprising:
a network interface configured to communicatively couple the apparatus to one or more other nodes in a network; and
a control circuit configured to:
repeatedly issue transmission cycles to the other nodes through the network interface, wherein a given transmission cycle includes a least one send slot for each of the other nodes to send data;
initiate transmission cycles by issuing beacon signals to the other nodes; and
determine when to issue a beacon signal in a given transmission cycle, including:
a determination that all of the other nodes have completed all associated send slots in an immediately previous transmission cycle, thus completing the other nodes' transmission; and
based upon a determination of the completion of the other nodes' transmission, delay transmission of the beacon signal for the given transmission cycle;
wherein the control circuit is further configured to set a delay of transmission of the beacon signal for the given transmission cycle by adding additional send slots to the immediately previous transmission cycle, wherein the additional send slots are configured to be unused by any of the nodes.

10. A method, comprising, at a node in a network:
repeatedly issuing transmission cycles to the other nodes in the network interface, wherein a given transmission cycle includes a least one send slot for each of the other nodes to send data;
initiating transmission cycles by issuing beacon signals to the other nodes; and
determining when to issue a beacon signal in a given transmission cycle by:
determining that all of the other nodes have completed all associated send slots in an immediately previous transmission cycle, thus completing the other nodes' transmission; and
based upon a determination of the completion of the other nodes' transmission, delaying transmission of the beacon signal for the given transmission cycle, wherein setting a delay of transmission of the beacon signal for the given transmission cycle is performed according to a function, wherein the delay of transmission of the beacon signal for the given transmission cycle is longer than a delay of transmission of a beacon signal for the immediately previous transmission cycle, wherein the delay of transmission of the beacon signal for the immediately previous transmission cycle was longer than a delay of transmission of a beacon signal for a further immediately previous transmission cycle.

11. The method of claim 10, further comprising selectively delaying transmission of the beacon signal for the given transmission cycle based upon possible generation of electromagnetic interference from the apparatus or the other nodes.

12. The method of claim 10, further comprising selectively delaying transmission of the beacon signal for the given transmission cycle based upon two or more further immediately previous transmission cycles having lengths shorter than a threshold.

13. The method of claim 10, further comprising selectively delaying transmission of the beacon signal for the given transmission cycle based upon two or more further immediately previous transmission cycles having lengths that are within a threshold difference of each other.

14. The method of claim 10, further comprising setting a delay of transmission of the beacon signal for the given transmission cycle that is different than a non-zero delay of transmission of a beacon signal for the immediately previous transmission cycle.

15. The method of claim 10, further comprising setting a variable delay of transmission of the beacon signal for the given transmission cycle.

16. The method of claim 10, further comprising setting a delay of transmission of the beacon signal for the given transmission cycle that is a random value.

17. A method, comprising, at a node in a network:
repeatedly issuing transmission cycles to the other nodes in the network interface, wherein a given transmission cycle includes a least one send slot for each of the other nodes to send data;
initiating transmission cycles by issuing beacon signals to the other nodes; and
determining when to issue a beacon signal in a given transmission cycle by:
determining that all of the other nodes have completed all associated send slots in an immediately previous transmission cycle, thus completing the other nodes' transmission; and
based upon a determination of the completion of the other nodes' transmission, delaying transmission of the beacon signal for the given transmission cycle, comprising setting a delay of transmission of the beacon signal for the given transmission cycle by adding additional send slots to the immediately previous transmission cycle, wherein the additional send slots are configured to be unused by any of the nodes.

18. A method, comprising, at a node in a network:
repeatedly issuing transmission cycles to the other nodes in the network interface, wherein a given transmission cycle includes a least one send slot for each of the other nodes to send data;
initiating transmission cycles by issuing beacon signals to the other nodes; and
determining when to issue a beacon signal in a given transmission cycle by:
determining that all of the other nodes have completed all associated send slots in an immediately previous transmission cycle, thus completing the other nodes' transmission; and
based upon a determination of the completion of the other nodes' transmission, delaying transmission of the beacon signal for the given transmission cycle, setting a delay of transmission of the beacon signal for the given transmission cycle according to a function, wherein the delay of transmission of the beacon signal for the given transmission cycle is shorter than a delay of transmission of a beacon signal for the immediately previous transmission cycle, wherein the delay of transmission of the beacon signal for the immediately previous transmission cycle was shorter than a delay of transmission of a beacon signal for a further immediately previous transmission cycle.

* * * * *